US008712116B2

(12) United States Patent  
Gouch

(10) Patent No.: US 8,712,116 B2  
(45) Date of Patent: Apr. 29, 2014

(54) IMAGE GENERATION BASED ON A PLURALITY OF OVERLAPPED SWATHES

(75) Inventor: Martin Philip Gouch, Herts (GB)

(73) Assignee: FFEI Limited, Hertfordshire (GB)

( * ) Notice: Subject to any disclaimer, the term of this patent is extended or adjusted under 35 U.S.C. 154(b) by 1018 days.

(21) Appl. No.: 11/873,757

(22) Filed: Oct. 17, 2007

(65) Prior Publication Data

US 2009/0103798 A1  Apr. 23, 2009

(51) Int. Cl.  
*G06K 9/00* (2006.01)

(52) U.S. Cl.  
USPC .............................. 382/128; 382/162; 348/79

(58) Field of Classification Search  
USPC .............................. 382/128, 133, 162; 348/79  
See application file for complete search history.

(56) References Cited

U.S. PATENT DOCUMENTS

| 5,381,236 A * | 1/1995 | Morgan ........................ 356/609 |
| 6,151,405 A * | 11/2000 | Douglass et al. ............. 382/133 |
| 6,920,239 B2 * | 7/2005 | Douglass et al. ............. 382/128 |
| 2007/0133856 A1 * | 6/2007 | Dutta-Choudhury ......... 382/133 |

* cited by examiner

*Primary Examiner* — Chan Park  
*Assistant Examiner* — Eueng-Nan Yeh  
(74) *Attorney, Agent, or Firm* — Sughrue Mion, PLLC

(57) ABSTRACT

A method of generating a digital representation of a portion of an object from sets of digital data defining the color content of individually stored, overlapping swathes of pixels of an image of the object portion. The method comprises:
  (a) selecting a portion of the object;
  (b) determining the swathes which contain pixels within the selected portion;
  (c) correlating adjacent ones of said swathes;
  (d) if necessary, adjusting the relative positions of the adjacent swathes in accordance with the results of the correlating step (c); and,
  (e) generating a digital representation of pixels of the selected portion from the correlated swathes.

21 Claims, 4 Drawing Sheets

IMAGE GENERATION BASED ON A PLURALITY OF OVERLAPPED SWATHES

FIELD OF THE INVENTION

The invention relates to a method of generating a digital representation of a portion of an object from sets of digital data defining the colour content of overlapping swathes of pixels in the image of the object portion.

DESCRIPTION OF THE PRIOR ART

In the field of scanning objects such as biological specimens, there are two primary approaches which have been adopted in the past. In the first approach, the object is placed on a translation stage beneath a microscope and is moved in a sequence of steps beneath the microscope. After each step, a two-dimensional image of the visible portion of the object is obtained and digitized utilizing a two-dimensional array digital camera. This produces digital data defining the colour content of a two-dimensional array of pixels, typically 2000× 3000 pixels, in the form of a "tile" which is then stored. A full image of the object is built up by obtaining a sequence of these tiles. An example of this approach is described in U.S. Pat. No. 6,272,235.

This approach to scanning an object has a number of disadvantages. For example, when a portion of the image needs to be viewed, it is usually necessary to join together a number of the tiles which leads to significant processing time and joins in more than one dimension.

2D array detectors typically have a gap between photo sites to enable the electronics to transfer the charge from the photosensitive area and these gaps mean that not all of the object is imaged so that small features, which are often important in the case of biological samples, can be missed. An example is cell walls which are smaller than the optical and geometric resolution can fade in and fade out in the image.

In addition in 2D array detectors, each light sensitive site can only detect a single colour, red, green or blue typically. Thus the gap between sites of the same colour is larger than the quoted resolution of the array. 2D cameras attempt to compensate for this by interpolating between the colours but this limits how much digital zoom can be used without visual artefacts in the data and also limits the resolution of the data that may be used for analysis. Again, small features such as cell walls which have been stained using a stain which can only be detected by the blue or red channel will suffer even more from the fade in and fade out effect described above.

2D array detectors also require a significant capture time after each step, typically 20 ms. This has the disadvantage of giving the object or sample an opportunity to move during the capture time thus blurring the image of the sample. This is particularly relevant to biological samples where live cells can move in a Brownian motion at around 20 ms-50 ms. Furthermore, adjacent tiles will represent images of the relevant portions of the object with at least a 20 ms time gap.

In view of all these disadvantages, a so-called linear scanning system has been developed in which the object is scanned using a one-dimensional or linear array of photodetectors. Typical linear CCD arrays have up to about 7200 photodetectors and are scanned in lines or swathes across the object. This is typically achieved by translating the object such as a biological sample under a microscope which focuses the image of the object onto a line scan CCD. The line scan CCD obtains colour data from a swathe of pixels, the width of the swathe corresponding to the length of the array. The sample is then moved laterally and a second swathe obtained and so on until the full sample has been scanned.

Linear or line scan CCD approaches have a number of advantages over the 2D array method described above. For example, joins between adjacent swathes only occur in one dimension as opposed to tiles which have joins in two dimensions.

Linear detectors generally have a 100% fill factor without gaps between detectors.

Typical line scan detectors are provided with a separate linear array of photodetectors for each colour and by suitably controlling the sampling times, it is possible to obtain colour information for each colour from each pixel.

Typical linear arrays can capture data from a sample in timeframes of around 0.3 milliseconds (as compared with the 20 millisecond sample time for two-dimensional arrays).

Some examples of linear scan systems are described in WO-A-01084209, U.S. Pat. No. 6,640,014 and GB-A-2206011.

In use, a sequence of swathes is generated by the linear arrays and conventionally these are then correlated together to produce a full digital image of the object. This image may then be split into separate tiles to make it easier to view small portions of the object, those tiles being "butt ready" in the sense that the joins between the tiles are automatically correlated by virtue of the swathes being pre-correlated. Tiles are also easier to store in conventional file formats as opposed to a single large digital image.

Despite their advantages, linear scan systems suffer from the disadvantage that it is necessary to correlate the large swathes of data in order to produce the final digital image of the object. This is a complex process and time consuming on computer time.

SUMMARY OF THE INVENTION

In accordance with a first aspect of the present invention, a method of generating a digital representation of a portion of an object from sets of digital data defining the colour content of individually stored, overlapping swathes of pixels of an image of the object portion comprises:

(a) selecting a portion of the object;

(b) determining the swathes which contain pixels within the selected portion;

(c) correlating adjacent ones of said swathes;

(d) if necessary, adjusting the relative positions of the adjacent swathes in accordance with the results of the correlating step (c); and, (e) generating a digital representation of pixels of the selected portion from the correlated swathes.

The inventor has appreciated that in many cases, it is only ever desired to look at portions of the overall image of the object and thus it is not necessary to carry out a correlation of all the swathes following the scanning step. Instead, it is only necessary to correlate those portions of the swathes which contain pixels within the selected portion. This significantly reduces processing time. A further advantage is that where a portion is fully contained within a single swathe then there is no need to carry out a correlation step at all and that portion can simply be displayed or otherwise extracted.

Typically, the method further comprises (f) displaying an image of the selected portion using the digital representation generated in step (e).

In addition, or alternatively, the generated digital representation can be stored or forwarded via a communication medium such as the Internet to a remote location.

A particular advantage of the invention is that steps (b)-(e) and (f) when it takes place can be carried out following step (a), i.e. after the portion of the object of interest has been selected. This should be contrasted with prior art methods in which the generation of the digital representation of the image are carried out before users wish to view the image.

It is particularly advantageous if steps (a)-(e) and optionally (f) are carried out in a substantially continuous sequence. Effectively, these steps can be carried out "on-the-fly" following the selection of a portion of the object to be viewed.

In the approach described above, the complete swathes which contain pixels within the selected portion are correlated prior to generating a digital representation of pixels of the selected portion.

In a more convenient method, which reduces processing time still further, step (b) comprises extracting from the determined swathes data corresponding to pixels within the selected portion, step (c) being performed using said extracted data. In other words, only pixels within the selected portion are identified and then the parts of the swathes containing those pixels are correlated.

In the methods described so far, steps (c) and (d) are carried out in sequence following steps (a) and (b). However, correlation could be carried out earlier and in accordance with a second aspect of the present invention, we provide a method of generating a digital representation of a portion of an object, the method comprising:

(i) scanning the object to obtain sets of digital data defining the colour content of overlapping swathes of pixels of an image of the object;

(ii) correlating adjacent ones of said swathes;

(iii) if necessary, adjusting the relative positions of the adjacent swathes in accordance with the results of the correlating step (ii); and, (iv) individually storing the correlated swathes, and then (a) selecting a portion of the object;

(b) determining the correlated swathes which contain pixels within the selected portion;

(c) generating a digital representation of pixels of the selected portion from the correlated swathes.

This aspect of the invention takes advantage of the fact that processor time may be available following scanning of an object but before portions of the object need to be extracted for viewing or the like. Typical swathes have maximum file size of 3 Gb.

As before, the generated digital representation of the selected portion will typically be viewed on a monitor or the like but in addition or alternatively, could be transmitted to a remote location for viewing or storage.

Again, it is particularly convenient if steps (a)-(c) are carried out in a substantially continuous sequence, i.e. on-the-fly, and where step (d) is carried out, it is preferable that steps (a)-(d) are carried out in a substantially continuous sequence.

The correlation method used can be of any conventional form and, for example, typically comprises identifying the location of the same image feature in each of a pair of adjacent swathes.

Where the digital data defines multiple colour components of overlapping swathes, then correlation is typically carried out using one of those colour components.

In order to locate a portion of an object to be viewed, this can be done by manual inspection but preferably the method further comprises carrying out a pre-scan of the object at a lower resolution than that used to define pixels of the overlapping swathes in order to determine the location of the desired object portion.

As explained above, the invention is particularly suited for use with biological specimens, particularly when viewed using a microscope, but of course is applicable in other applications where portions of a scanned object are to be viewed or the like.

BRIEF DESCRIPTION OF THE DRAWINGS

Some examples of methods according to the invention will now be described with reference to the accompanying drawings, in which:—

DESCRIPTION OF THE EMBODIMENTS

Figure 1:
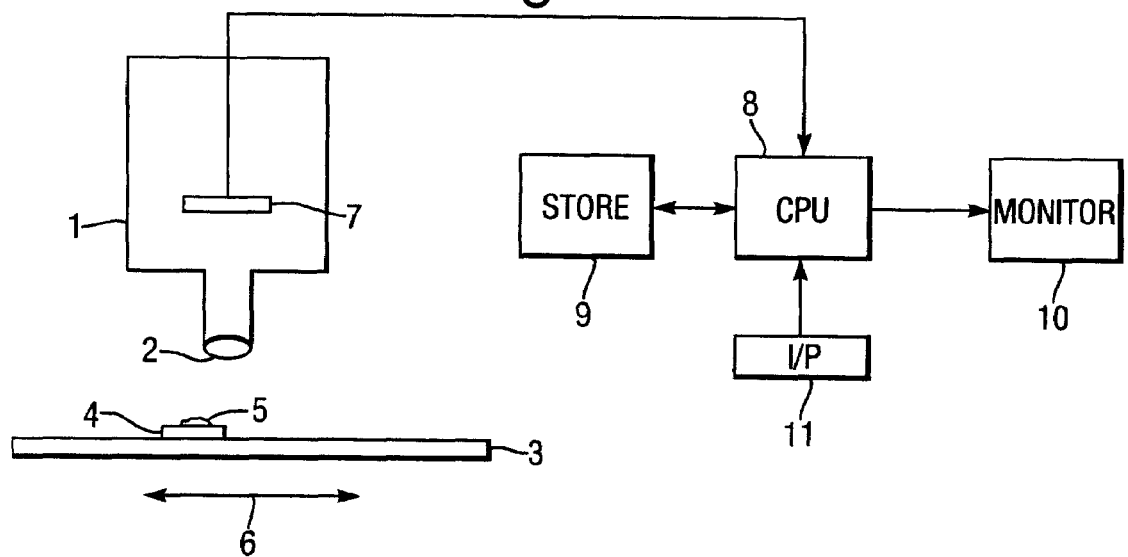
FIG. 1 is a schematic block diagram of apparatus for carrying out methods according to the invention.

The apparatus shown in FIG. 1 comprises a microscope 1 of conventional construction having a focusing lens 2 and facing towards a sample support 3. The support 3 can be controlled to translate a sample or object 4 on a specimen slide 5 beneath the focusing lens 2 in orthogonal directions, one of which is shown by arrow 6.

The portions of the image viewed by the lens 2 are focused onto a linear CCD array 7 located within the microscope 1. The information from the individual photodetectors within the CCD array 7 is digitized and downloaded in a conventional manner to a processor 8 where the data can be stored in a store 9. Images can be displayed on a monitor 10 under the control of the processor 8 which itself can be controlled via an input device 11 such as a keyboard or mouse.

Figure 2:
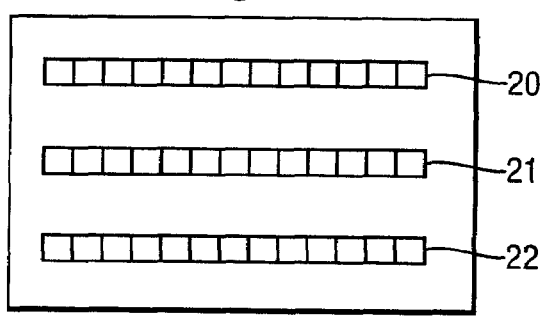
FIG. 2 illustrates schematically a linear CCD array.

FIG. 2 illustrates a typical structure for the linear CCD array 7. In this structure, three parallel linear arrays of photodetectors 20-22 are provided, each of which is sensitive to a respective one of three colour components, typically green, red and blue. The arrays 20-22 are arranged to extend parallel with the arrow 6.

When an object or specimen 5 is to be scanned, the support 3 is moved in a stepwise fashion from left to right as shown in FIG. 1 and after each step, the transport 3 is moved in a direction orthogonal to the direction 6 (into the paper in FIG. 1) so that the arrays 20-22 scan along a swathe of the object. Each array 20-22 is operated with a sampling time of about 0.3 milliseconds, the data collected by a photodetector during that period corresponding to the colour component content of a single pixel. This data is downloaded to the processor 8. The sampling times of the arrays 20-22 are controlled so that each array will sample the same pixels, the pixels abutting each other in the swathe direction. The processor 8 then stores the raw digital data obtained from the arrays 20-22 in the store 9, typically as 24 bit data per pixel, there being typically 7200 pixels across the width of a swathe, i.e. the length of each array 20-22, and the number of pixels in the elongate direction of the swathe being determined by the length of the scan. Each swathe is then stored in a separate file.

Figure 3:
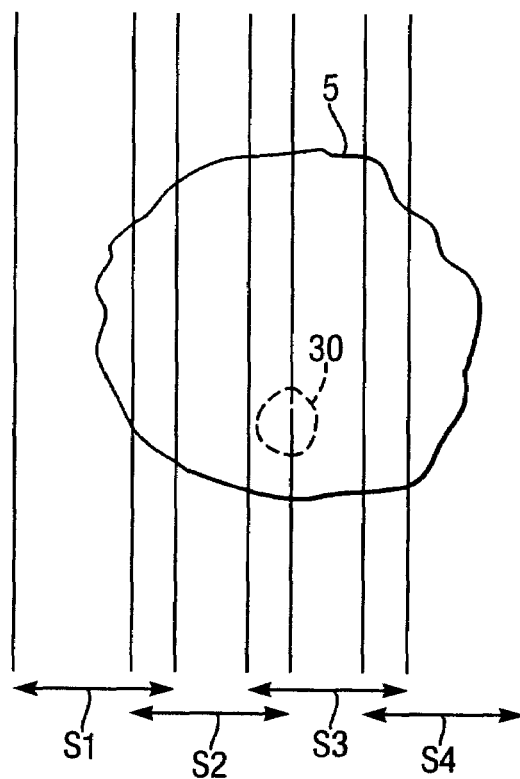
FIG. 3 illustrates an arrangement of swathes relative to an object being scanned.

Since it is not possible to ensure within the accuracy of the support 3 that adjacent swathes exactly abut one another, the scanning is arranged such that adjacent swathes overlap. This is shown in FIG. 3 where the object 5 is illustrated with four swathes S1-S4 superimposed upon the object. As can be seen in FIG. 3, swathe S2 overlaps swathe S1, swathe S3 overlaps swathe S2, and swathe S4 overlaps swathe S3. Typically, the overlap is by 50 or 60 pixels while the total swathe width is 7200 pixels.

The processor 8 individually stores the data for each swathe S1-S4 in the store 9 as explained above.

Figure 4:
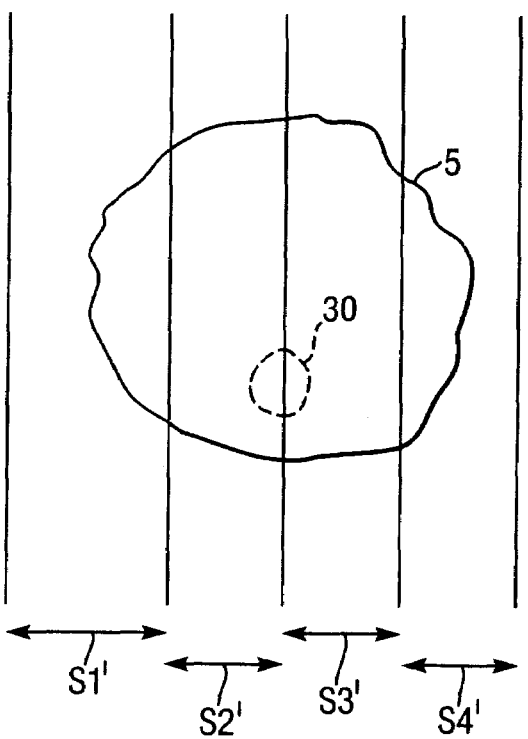
FIG. 4 illustrates the swathes of FIG. 3 following the correlation process.

In one embodiment, the swathes are then correlated so as to compensate for small misalignments between pixels in adjacent swathes. There are a variety of ways in which correlation can be achieved and some of these, which are applicable to this invention, are described in more detail in GB-A-2206011 incorporated herein by reference. Typically, the correlation algorithm looks for a common feature in adjacent swathes, i.e. within the overlap region, and then adjusts one swathe relative to the other laterally and/or longitudinally to bring the two sets of pixels into alignment. Following this process, the swathes are redefined and stored as perfectly abutting swathes. This is illustrated in FIG. 4 where swathe S1 is maintained unchanged but swathe S2 has been redefined in a narrower form S2' exactly abutting swathe S1. In a similar manner, swathe S3 has then been correlated with swathe S2 to generate a modified swathe S3' and swathe S4 has been correlated with swathe S3 to generate modified S4'. These modified swathes are then individually stored in the store 9 by the processor 8 for further use.

Figure 5:
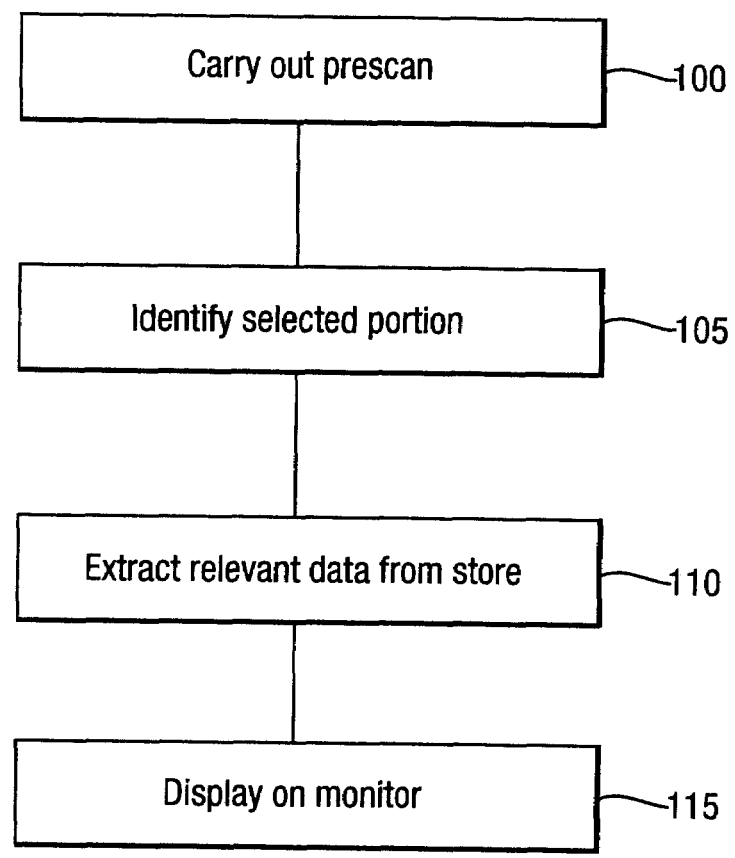
FIG. 5 is a flow diagram illustrating a first example of a method according to the invention; and, FIG. 6 is a flow diagram illustrating a second example of a method according to the invention.

In this first method according to an example of the invention, the user carries out a pre-scan of the object 5 using the microscope 1 to identify a portion 30 of the object which he wishes to view in detail (step 100, FIG. 5).

As will be seen in FIG. 4, the selected portion 30 extends across the boundary between two swathes S2' and S3'.

The processor 8 is then notified via the input device 11 of the location of the selected portion 30 (step 105) and the processor 8 then extracts the precorrelated pixel data from the store 9 corresponding to the selected portion 30 and outputs this onto the monitor 10 for viewing (steps 110,115).

This provides a relatively simple approach but does require that the swathes are precorrelated as described above in connection with FIGS. 3 and 4.

An alternative and preferred method will now be described, this method taking place following the scanning and storage of the raw swathe data as shown in FIG. 3. In this case, the user carries out a pre-scan as before (step 150, FIG. 6) and identifies the selected portion 30 to the processor 8 via the input device 11 (step 155).

The processor 8 then determines the swathes which contain pixels within the selected portion 30 (step 160) and in this case these are the swathes S2,S3.

In step 165, the processor 8 carries out a correlation process between the adjacent swathes S2,S3 in the manner described above and if necessary adjusts the relative positions of the swathes in accordance with the correlating step so as to produce a modified form S3' of swathe S3 which perfectly abuts the right hand side of swathe S2.

The processor 8 then extracts the pixel data from the perfectly abutted swathes S2,S3' defining the selected portion 30 (step 170) and displays the portion of the monitor 10 (step 175).

In the method described above, the full swathes S2,S3 were correlated.

Further reductions in processing time can be achieved by extracting only the data defining pixels within the selected portion 30 from the original swathes S2,S3. Only this data is then correlated and adjusted and then extracted and displayed.

Figure 6:
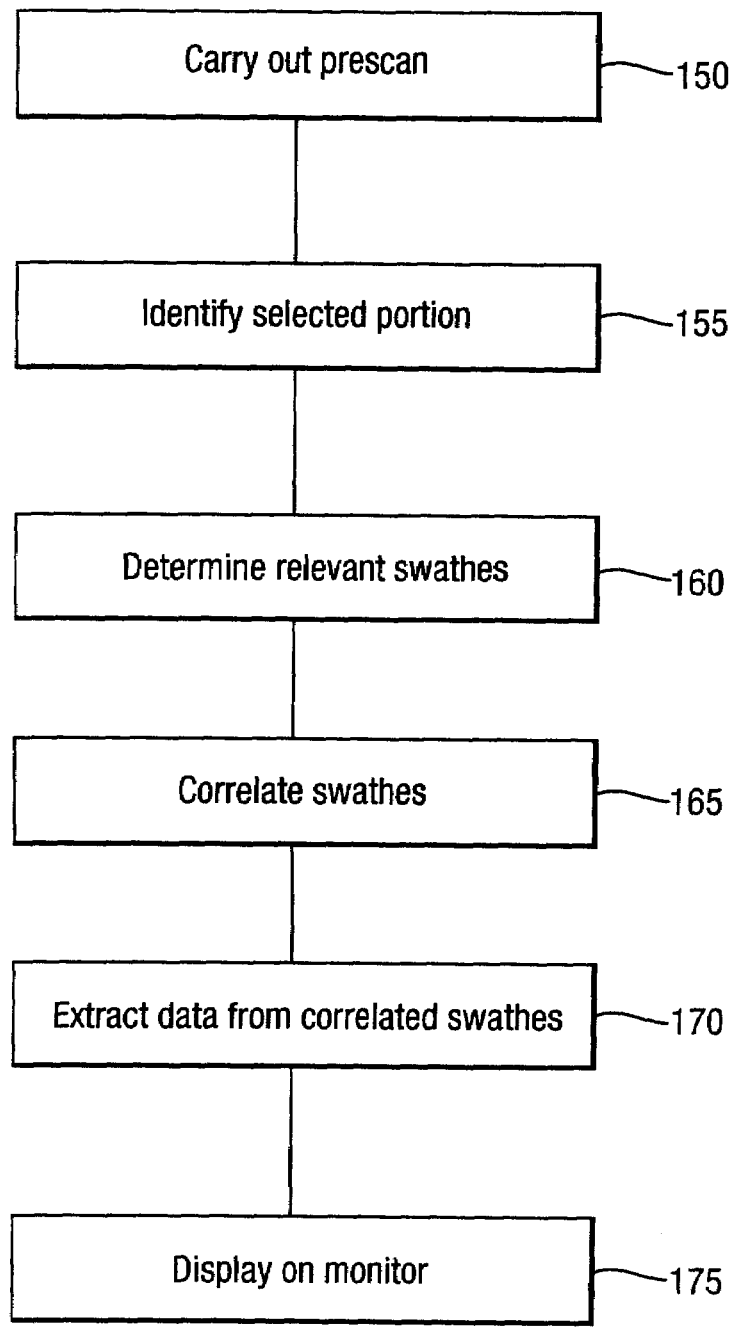

It will be understood that the steps set out in FIGS. 5 and 6, namely steps 105-115 and 155-175, are preferably carried out in a substantially continuous sequence, i.e. on-the-fly.

I claim:

1. A method of generating a digital representation of a portion of an object from sets of digital data defining colour content of individually stored, overlapping swathes of pixels of an image of the object portion, the method comprising carrying out the following steps in a substantially continuous sequence:
   (a) receiving user input selecting a portion of the object and in response to the receiving user input performing the following steps:
   (b) determining ones of the swathes which contain pixels within the selected portion;
   (c) after the determining of the swathes at step (b), correlating adjacent ones of said determined swathes;
   (d) adjusting the relative positions of the correlated adjacent swathes in accordance with the results of the correlating step (c);
   (e) generating a digital representation of pixels of the selected portion from the correlated adjacent swathes; and
   (f) displaying an image of the selected portion using the digital representation generated in step (e);
   wherein the overlapping swathes of pixels are collected at a high resolution and stored prior to receiving, via user input, the selection of the portion of the object;
   wherein receiving user input selecting a portion of the object of step (a) comprises:
   producing a pre-scan of the object at a resolution lower than the high resolution, the lower resolution pre-scan being performed after collecting the overlapping swathes of pixels at high resolution; and
   wherein the correlating in step (c) is based on the high resolution data.

2. A method according to claim 1, wherein step (b) further comprises extracting from the determined swathes data corresponding to pixels within the selected portion, step (c) being performed using said extracted data.

3. A method according to claim 1, wherein steps (a)-(e) are carried out in a substantially continuous sequence.

4. A method according to claim 3, further comprising (f) displaying an image of the selected portion on a monitor using the digital representation generated in step (e), wherein steps (a)-(f) are carried out in a substantially continuous sequence.

5. A method according to claim 1, wherein step (c) comprises identifying the location of the same image feature in each of a pair of adjacent swathes.

6. A method according to claim 1, wherein said digital data defining said overlapping swathes defines multiple colour components of each pixel of the swathes, step (c) being carried out using one of said colour components.

7. A method according to claim 1, wherein step (d) comprises laterally adjusting the location of one swathe relative to another in accordance with the results of step (c).

8. A method according to claim 1, wherein step (d) comprises adjusting the location of one swathe relative to another along the length of the swathes in accordance with the results of step (c).

9. A method according to claim 1, wherein the object is a biological specimen.

10. A method according to claim 1, wherein the colour content of said overlapping swathes is determined using a microscope.

11. A method according to claim 1, wherein the colour content of said overlapping swathes is determined using a microscope.

12. A method according to claim 1, wherein the steps (a)-(e) are carried out in a continuous sequence.

13. A method according to claim 1, wherein the steps (a)-(e) are carried out in a continuous uninterrupted sequence.

14. A method according to claim 1, wherein the steps (a)-(e) are carried out on-the-fly.

15. A method of generating a digital representation of a portion of a microscope sample, the method comprising:
   (a) receiving, via user input, a selection of a portion of one or more objects disposed on the microscope sample;
   (b) determining, out of a set of pre-stored swathes, ones of the swathes which contain pixels within the selected portion;
   (c) after the determining of the swathes at step (b), correlating adjacent ones of said determined swathes;
   (d) adjusting relative positions of said correlated adjacent swathes in accordance with the results of the correlating step (c);
   (e) generating a digital representation of pixels of the selected portion from said correlated adjacent swathes; and
   (f) displaying an image of the selected portion using the digital representation;
   wherein the pre-stored swathes comprise digital data defining pixel images of a plurality of overlapping regions of the microscope sample and the swathes are individually stored;
   wherein the pre-stored swathes are collected at a high resolution and stored prior to the receiving, via user input, the selection of the portion of one or more objects disposed on the microscope sample;
   wherein receiving user input selecting a portion of the object of step (a) comprises:
   producing a pre-scan of the object at a resolution lower than the high resolution, the lower resolution pre-scan being performed after collecting the overlapping swathes of pixels at high resolution; and
   wherein the correlating in step (c) is based on the high resolution data.

16. The method of claim 15, wherein steps (a) to (f) are carried out in a substantially continuous sequence.

17. The method of claim 15, wherein the pre-stored swathes comprise individual swathes collected by a linear CCD array during a run along one line.

18. The method of claim 15, further comprising: providing a user with a means to select a portion of one or more objects disposed on the microscope sample.

19. The method of claim 15, wherein steps (a) to (f) are carried out in a continuous sequence.

20. The method of claim 15, wherein steps (a) to (f) are carried out in a continuous uninterrupted sequence.

21. The method of claim 15, wherein steps (a) to (f) are carried out on-the-fly.

* * * * *